United States Patent [19]

Whitehurst et al.

[11] 3,944,501

[45] Mar. 16, 1976

[54] SORBENT FOR REMOVAL OF HEAVY METALS

[75] Inventors: Darrell D. Whitehurst, Titusville; Stephen A. Butter, East Windsor; Paul G. Rodewald, Rocky Hill, all of N.J.

[73] Assignee: Mobil Oil Corporation, New York, N.Y.

[22] Filed: Oct. 16, 1973

[21] Appl. No.: 406,997

Related U.S. Application Data

[60] Division of Ser. No. 365,358, May 30, 1973, Pat. No. 3,793,185, which is a continuation-in-part of Ser. No. 319,099, Dec. 27, 1972, abandoned.

[52] U.S. Cl............. 252/182; 208/251 R; 208/252; 208/253; 252/429 R; 252/430; 252/189
[51] Int. Cl.$^2$... B01J 1/22; B01D 15/00; C09K 3/32
[58] Field of Search.... 252/189, 411 R, 413, 420 R, 252/430, 182; 208/252, 251 R, 253

[56] References Cited
UNITED STATES PATENTS

| | | | |
|---|---|---|---|
| 2,453,138 | 11/1948 | Kharasch | 208/251 |
| 2,504,134 | 4/1950 | Kharasch | 208/251 |
| 3,176,041 | 3/1965 | Ayers | 208/263 |
| 3,751,507 | 8/1973 | Walker | 208/263 |

*Primary Examiner*—Benjamin R. Padgett
*Assistant Examiner*—Irwin Gluck
*Attorney, Agent, or Firm*—Charles A. Huggett; Michael G. Gilman

[57] ABSTRACT

A novel use for sorbents involving the selective removal of heavy metals from liquid streams has been discovered. More specifically it has been discovered that these sorbents selectively remove alkyl lead moieties from gasoline. The sorbents are comprised of metal halides (preferably tin tetrachloride or antimony pentachloride) bonded to a suitable substrate through at least one amine or alkyl halide functional group. The sorbents can be effectively regenerated.

6 Claims, 12 Drawing Figures

LEAD REMOVAL CAPACITY OF PR-44 (12 LHSV)

FIGURE 6

LEAD REMOVAL CAPACITY OF PR-48(12LHSV)

FIGURE 7

LEAD REMOVAL CAPACITY OF PR-46(12LHSV)

GASOLINE (.38g Pb/gal)

FIGURE 8

LEAD REMOVAL CAPACITY OF SB-13 (11-13 LHSV)

GASOLINE (.33 - .39 g Pb/gal.)

Pb CONTENT OF EFFLUENT vs. CONTACT TIME ( SnCl$_4$ -ACTIVE HALOGEN RESIN SB-13 )

FIGURE 12

LEAD REMOVAL CAPACITY AND CONTACT TIME $CN(C)_2 \cdot SnCl_4$ (SB-8)

INFLUENT Pb CONC. = 0.33 g/gal

SORBENT FOR REMOVAL OF HEAVY METALS

RELATED CASE

This is a division of U.S. application Ser. No. 365,358, filed May 30, 1973 which issued as U.S. Pat. No. 3,793,185; that case being a continuation-in-part of application Ser. No. 319,099 filed Dec. 27, 1972 and now abandoned.

This application is a continuation-in-part of now pending U.S. application serial number 319,099 filed December 27.

BACKGROUND OF THE INVENTION

I. Field of the Invention

The invention deals with the removal of metals from compositions containing such metals as organic or inorganic compounds. It more particularly refers to removal of lead from gasoline.

The need for the removal of metals is evidenced by the fact that their presence in hydrocarbon charge stocks conducted to catalytic cracking and catalytic reforming process units is known to poison and shorten the life of the catalyst with which such metal contaminated stocks come into contact.

It is also desirable to remove trace metals from lubricating oils or to recover soluble metal catalysts from reactor effluents or polymer solutions. The removal of heavy metals such as mercury, silver, calcium and the like from the water effluents of chemical or photographic plants is also highly desired from an ecological standpoint.

Unburned hydrocarbon, carbon and carbon monoxide emissions are regarded by many as representing a substantial source of air pollution. These engine emissions are subject to photo-chemical reaction in the atmosphere, providing what has been termed smog, which is an irritant of lachrymal and respiratory system tissues.

The incompletely oxidized carbon, e.g., carbon monoxide and unburned hydrocarbons, present in engine exhaust is the result of incomplete combustion of the hydrocarbon fuel in the engine combustion chamber. Complete oxidization of such carbon monoxide and/or hydrocarbons transforms such to carbon dioxide and water, probably in the form of steam due to the high combustion temperature. Neither carbon dioxide nor steam is considered a harmful emission.

Various means have been employed to reduce or eliminate carbon monoxide and unburned hydrocarbon emissions. One approach has been to pass the combustible exhaust gases through a catalytic converter located in the engine's exhaust system where the carbon monoxide and hydrocarbons are catalytically oxidized, usually by the introduction of supplemental air, to carbon dioxide and water.

It is known that residues of alkyl lead from combustion of leaded gasoline tend to poison catalysts available for oxidizing unburned hydrocarbons and carbon monoxide in an engine exhaust. Such poisoning severely shortens the useful life of exhaust combustion catalysts. Furthermore the presence of lead complexes in engine exhaust is considered objectionable by some. Therefore the removal of lead from gasoline might be desirable separate and apart from its characteristic of poisoning exhaust combustion catalysts. It has thus been heretofore proposed that "lead free" gasoline be supplied for use in automobiles equipped with emission control devices which utilize catalysts to help further oxidize exhaust gases.

Under most proposals, small, trace amounts of lead would be allowed in "lead free" gasoline. The Federal Government regulations require all gasoline sales outlets to furnish at least one grade of gasoline having less than 0.07 gram of lead per gallon to the public by July 1, 1974. On Feb. 23, 1972 the Environmental Protection Agency in a paper relating to the 1970 Clean Air Act Amendments offered for comment a requirement of 0.05 grams of lead per gallon of gasoline. The lead level reduction is to be accomplished by July 1, 1974. Other proposals have been even more stringent.

The normal network of petroleum product distribution involves railroad tank cars, pipelines, water borne tankers, tank trucks and bulk storage tanks. For commercial operation these are presently set up to handle different products. For example, the same pipeline might be used to convey a shipment of regular grade gasoline, premium grade gasoline, distillate fuel and other light liquid products in succession. According to present procedures, that portion of the fluids carried by the pipeline which constitutes an intermingling of the two products at their interface is diverted to use with the lower grade product, thus avoiding degradation of the higher grade hydrocarbon.

However when leaded gasoline is followed by lead-free gasoline, not just the interface comprising in intermingling of the two products, but the entire leadfree shipment becomes degraded. When leaded gasoline, containing tetraethyl lead, tetramethyl lead or a mixture of transalkylation products of the two is contacted with the metal or other surfaces of transportation and storage facilities, a significant amount of lead is left deposited in scale and on these surfaces. Since alkyl lead components are infinitely soluble in light hydrocarbons such as gasoline, upon after using the same faculties for lead free gasoline the latter product becomes contaminated with lead which may run as high as about 0.1 grams of lead per gallon or more. These amounts of lead are sufficient to impair the life of exhaust emission control oxidation catalysts and are in excess of the presently proposed allowable limits on lead content of lead free gasolines.

II. Description of the Prior Art

Techniques have heretofore been known for removal of dissolved or suspended heavy metal contaminants from liquid products.

In catalytic cracking and reforming operations, the use of guard chambers containing a variety of sorbents and/or catalysts intended to remove heavy metal contaminants from the charge stock before contact is made with the catalyst have been described. Catalytic hydrodesulfurization processes and catalysts remove some amount of heavy metal contamination from hydrocarbon streams processed thereby.

Systems for removal of lead from gasoline have also been proposed. Presently known techniques require considerable time or are non-selective in effecting removal from the gasoline not only of the lead but also of those additives which are desired to be retained, such as antioxidants, anti-icing additives, metal passivators, detergents and the like.

One previously proposed system for removing lead from gasoline is described in U.S. Pat. No. 2,368,261. There, acid activated clay, such as bentonite which had been previously treated with hydrochloric or sulfuric acid, is used. Leaded gasoline is percolated through the clay whereby up to 95% of the lead present is removed. Unfortunately, acid activated clays will also remove other gasoline additives which are required or desired for proper protection and functioning of automotive equipment.

Another approach is that described in U.S. Pat. No. 2,392,846. According to an Example in this patent, a five gallon lot of leaded gasoline is treated with 20 ml. of stannic chloride followed by addition of 100 grams of activated carbon. This results in decomposition of the tetraalkyl lead and adsorption of the lead decomposition products on the activated carbon thus drastically reducing the lead content. The gasoline is removed from the activated carbon by decantation. This is a very slow process which permits the processing of about 35 gallons of gasoline per hour. Unfortunately even in this system, the additives desired to be retained in the gasoline are also adsorbed by the activated carbon.

Both the processes described in the cited prior patents depend for effectiveness on a chemical conversion of the tetraalkyl lead. The lead compounds can be reacted with such materials as halogens, halogen acids, metal halides, metal salts, sulfur dioxide, carboxylic acids, metals in the presence of hydrogen etc. While alkyl leads are infinitely soluble in gasoline, the resulting decomposition products are not readily soluble in hydrocarbons and hence can be selectively adsorbed on high surface adsorbents.

The American Oil Company, in a paper presented at the May 9, 1972 meeting of the API Division of Refining noted that in a significant number of its stations it was presently unable to meet the 0.05 gram/gal. or even the 0.07 gram/gal. requirement using scrutinous control of their distribution system and segregation of products. The area of greatest potential contamination was that of the service station itself. The report would indicate that all gasoline manufacturers relying only on distribution control to ensure that the unleaded gasoline will remain within specifications, face an extremely difficult and expensive undertaking.

It is a primary objective of this invention to provide means to remove heavy metals from liquid, particularly hydrocarbon, streams. It is a further objective of this invention to remove lead alkyls from gasoline. It is an objective of this invention to selectively remove these metals from hydrocarbon streams by such means as will not remove gasoline additives, such as detergent additives, from gasoline streams. It is an objective of this invention to provide for means for removing lead alkyls from gasoline, such means being capable of regeneration. Other and additional objects of this invention will become apparent from a consideration of this entire specification including the claims and drawings.

SUMMARY OF THE INVENTION

In accordance with and in fulfillment of the aforestated objectives, an embodiment of this invention consists of utilizing a sorbent comprising a porous solid substrate having pores with a minimum pore diameter of about 10 A and a minimum surface area of about 10 $m^2/g$; the substrate being modified by at least one functional group of an amine, alkyl halide or the like which acts as a bridging member between the substrate and at least one metal halide; mixed functional groups of amines or other weak Lewis bases with alkyl halides being particularly effective; the metal being a Group IB, IIB, IIIA, IVA, VA, VIA or VIII metal having an atomic number of at least 13, for the removal of heavy metals from non-aqueous liquid solutions, and more particularly for removing lead from gasoline. For purposes of this disclosure, the metal group designations referred to are as defined in *Lange's Handbook of Chemistry* at 58-61 (10th ed. 1967). The gasoline is passed through said sorbent at a space velocity of up to 300 LHSV and a temperature of about −50° to 100°C.

Halides of the following metals work particularly well: iron (Fe), copper (Cu), silver (Ag), zinc (Zn), cadmium (Cd), mercury (Hg), aluminum (Al), tin (Sn), lead (Pb), phosphorous (P), arsenic (As), antimony (Sb), bismuth (Bi), sulfur (S), selenium (Se) and tellurium (Te). Those salts having a Lewis acid character exhibited unusually superior results.

The sorbents were prepared by a batch sorption technique in a manner which may be generally described as follows: 10cc of a metal halide such as tin chloride was added while stirring to approximately 150cc of a solvent such as acetone in a 500cc Erlenmeyer flask. To this mixture approximately 50cc of functionalized sorbent matrix was added. The flask was stoppered and the mixture was shaken occasionally over a period of about one half hour. The mixture including the added matrix was then transferred to a chromatographic column and washed twice with approximately 50cc volumes of a solvent such as acetone. The sorbent was dried by passing $P_2O_5$ dried nitrogen through the sorbent bed. An aliquot of the sorbent was swelled with the gasoline being used.

In a preferred embodiment, the metal salts of stannic chloride and/or antimony pentachloride bonded to a substrate having a surface area of at least 10 $m^2/g$. with pore diameter of at least 10A, through an amine bridging member produced an extraordinary ability to remove lead tetraethyl and tetramethyl compounds from gasoline. As illustrated by Table 7, described later in this disclosure in greater detail, a sorbent having a substrate of silica, a metal halide of stannic chloride bonded to the substrate by means of a tertiary amine reduced the lead concentration of gasoline from 0.36 g/gal. to 0.01 g/gal for 150 bed volumes of operation.

Furthermore, as depicted in Table 9, also described in greater detail later in this disclosure, the sorbent which comprises an embodiment of this invention removes lead moieties and other heavy metals selectively; important and needed additives such as cleansing detergents are not substantially removed.

While not wishing to be limited by a specific theory of operability, it is believed that the lead removal by the sorbents of this invention may be represented by the following notation:

where X is a halogen and R is an alkyl. The above notation and the operation which it represents will be amplified later in the specification, and specifically in the section where the examples are described.

Another embodiment of this invention involves the method of regenerating a sorbent as previously described by means of acid extraction. In the preferred embodiment, a volume of sorbent which is "spent," that is, no longer active for lead removal due to prolonged use, is washed sequentially with about 15 volumes of benzene, methanol and water. Then about 25 volumes of about 20% hydrochloric (HCl) is passed over the sorbent. The sorbent is then washed free of acid and dried. The regenerated sorbent is then reactivated with a solution of the metal halide (a preferred sorbent is acetone) in a proportion of about 1:15 metal halide to sorbent as it is passed over the sorbent. Finally the "regenerated" sorbent is washed with 10 volumes of solvent and air dried.

Other embodiments of this invention comprise the system and method of employing the previously described sorbent at any point in a system for distributing and dispensing motor fuels or in an automobile fuel system so as to substantially remove lead.

DESCRIPTION OF PREFERRED EMBODIMENTS

In a preferred embodiment, the sorbent is placed in a canister in the discharge hose of a service station gasoline pump. This preferred embodiment is more particularly described by making reference to FIG. 1–3.

Figures 1, 2, 3:
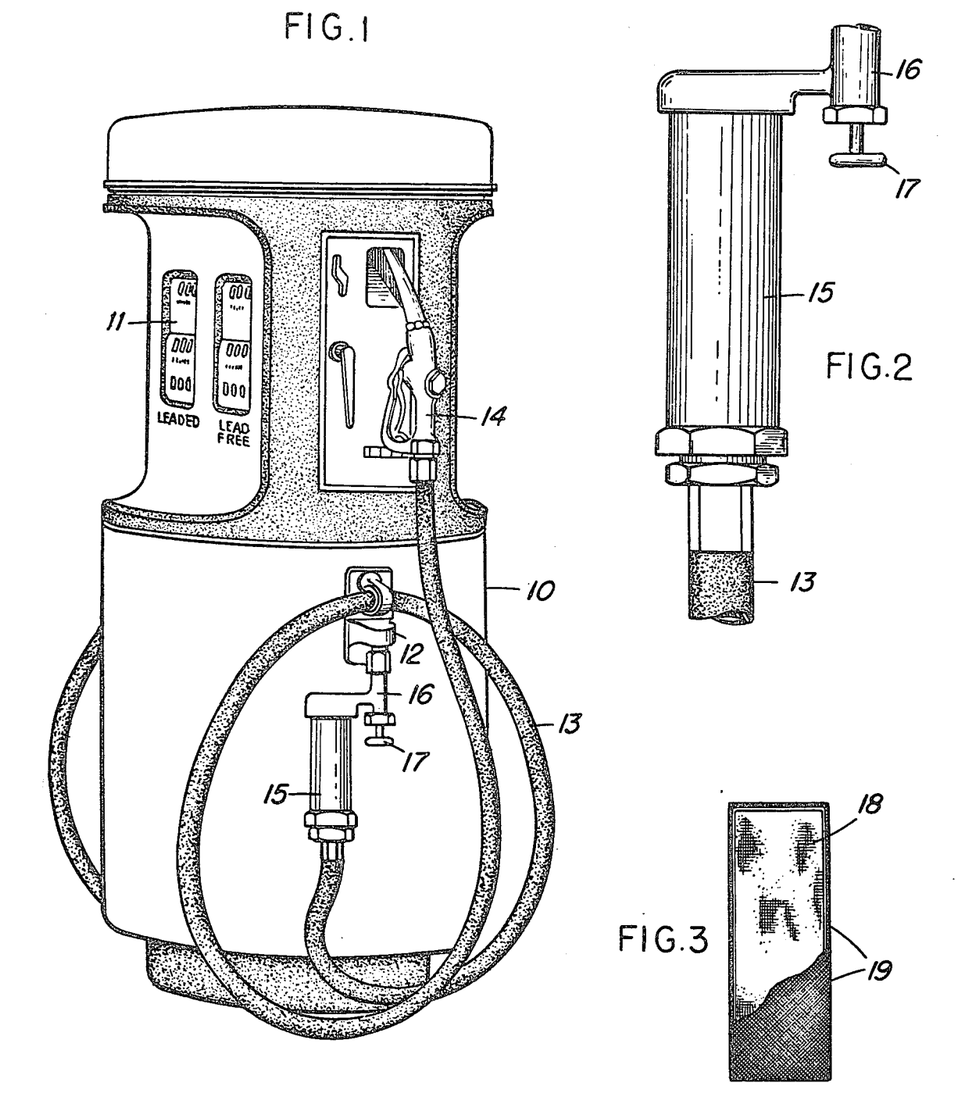
FIG. 1 of the drawings attached hereto represents a typical service station gasoline pump modified according to the present invention.
FIG. 2 is an enlarged view of the cartridge for containing the lead removal agent.
FIG. 3 is a view in fragmentary section of a cartridge for containing the lead removal agent.

As shown in FIG. 1, a gasoline dispensing pump of conventional design includes a housing indicated generally at 10 within which are contained a motor driven pump and a metering device, not shown. The metering device drives, through suitable gearing, indicators within a panel 11 to report gasoline dispensed and price for the amount so dispensed. The fuel after passing through the metering device, is conducted to the outside of the housing through a pipe connection 12 and into a discharge hose 13 equipped with a valve nozzle 14.

The modification to conventional dispensing pumps is a canister 15 connected to the fuel discharge 12 by a pipe 16 provided with a valve for which the operating handle is shown at 17. Fuel from the pipe 16 is conducted to the top of canister 15 containing the lead removal agent from which it passes through a suitably prepared cartridge and is thence discharged to hose 13 and nozzle 14.

A typical cartridge is shown is FIG. 3 as constituted by a gauze container 18 within a wire mesh supporting cage 19. Disposed within the container gauze 18 is a mass of the lead removal agent of the type which characterizes this invention.

For the usual service station, a cartridge having a diameter of about 24 inches and length of about 12 inches should be adequate to reduce the lead content to acceptable levels for a working life of about 1 month. For stations having larger substantially "lead free" gasoline throughput, either the cartridge may be changed more often, or a larger cartridge may be installed between the fuel tank and the dispensing pump. (As previously noted, this disclosure contemplates utilizing the sorbent at any point in a system for distributing and dispensing motor fuels.). Again referring to FIG. 2, when it is desired to change the cartridge, valve 17 is closed, the hose 13 is drained and the canister 15 is removed by unthreading from the top portion thereof. It is thus a simple matter to replace the cartridge in a very short period of time and return the dispensing pump to duty.

Applicant has discovered that performance of the previously described sorbent can be appreciably enhanced by the addition of an absorption material such as charcoal. Such an absorption or deliquesent material may either be mixed with sorbent particles contained in the canister 15 or be located upstream or downstream of the sorbent. When the absorption material is utilized to remove trace amounts of water in gasoline a preferred embodiment entails the location of the absorption material upstream of the sorbent.

EXAMPLES 1–8

The sorbents were prepared by a batch sorption technique in a manner which may be generally described as follows:

10cc of a metal halide such as tin chloride was added while stirring to approximately 150cc of a solvent such as acetone in a 500cc Erlenmeyer flask. To this mixture approximately 50cc of functionalized resin matrix was added. The flask was stoppered and the mixture was shaken occasionally over a period of about one-half hour. The mixture including the added resin was then transferred to a chromatographic column and washed twice with approximately 50cc volumes of a solvent such as acetone. The resin was dried by passing $P_2O_5$ dried nitrogen through the resin bed.

These tests consisted of contacting approximately three to six volumes of gasoline containing 2.5 grams of lead/gallon gasoline with one volume of sorbent under ambient conditions, followed by a lead analysis of the contacted gasoline. The period of contact time is noted in the first five examples. (The lead analyses after 20 minutes 1 hour and 3 hours roughly correspond to those found under flow conditions at space velocities of 9, 3 and 1 LHSV, respectively).

Figure 4:
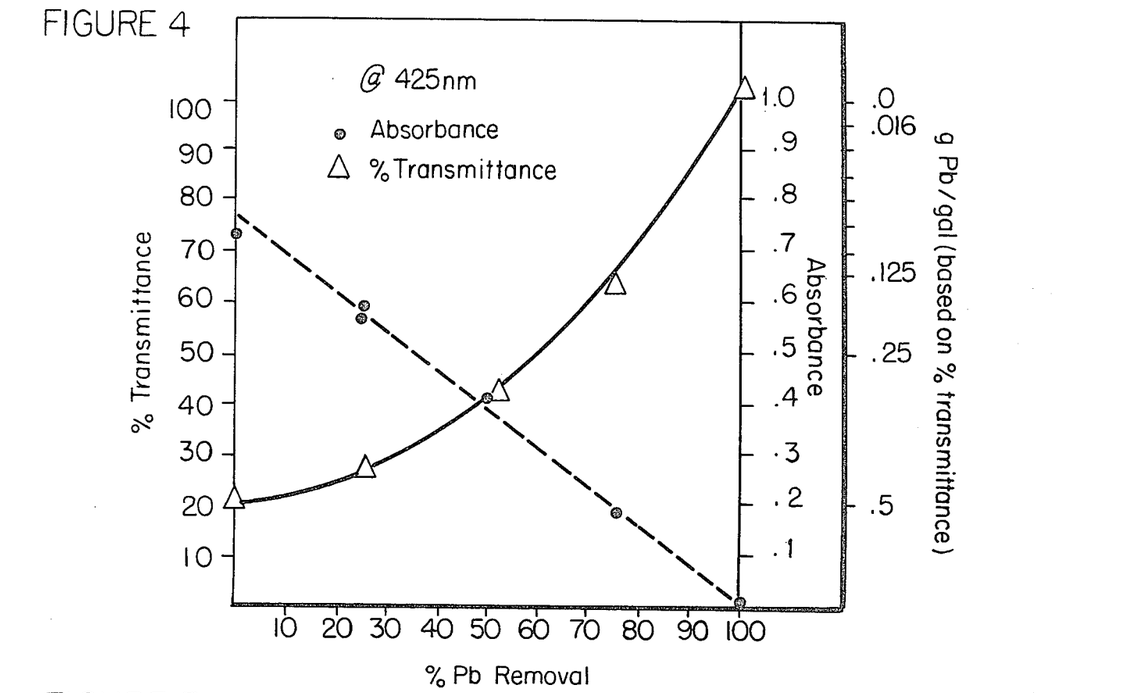
FIG. 4 is an analytical curve illustrating amount of lead removal as a function of absorbance and transmittance.
Figure 5:
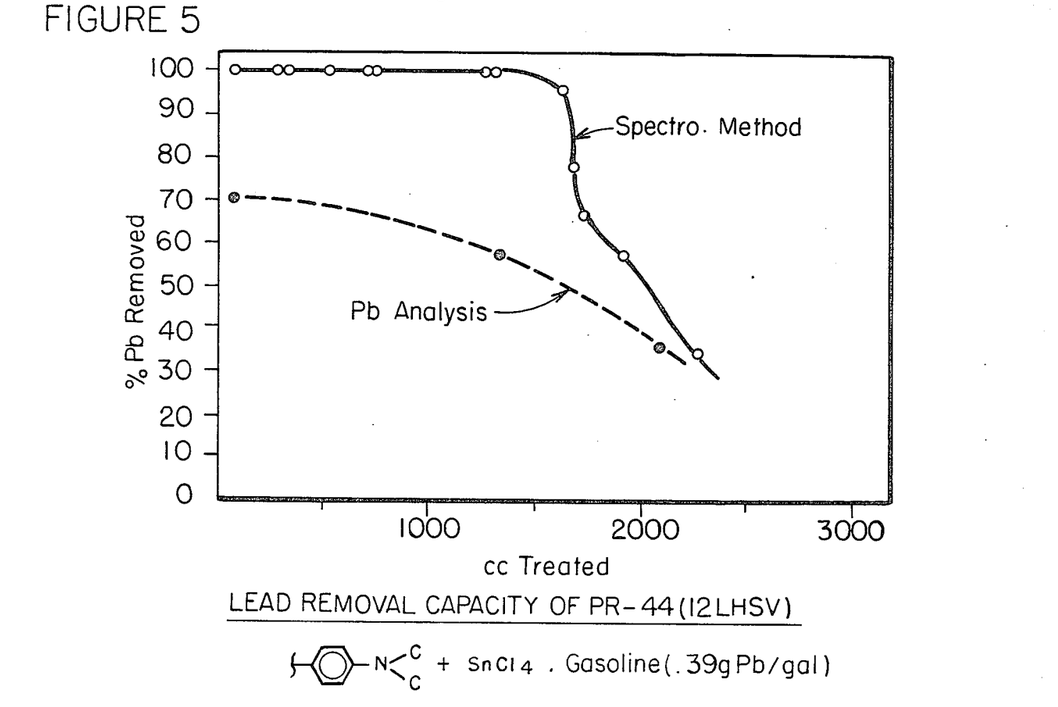
FIGS. 5–8 are curves comparing turbidometric analysis with atomic absorption analysis for four selected sorbents.
Figure 6:
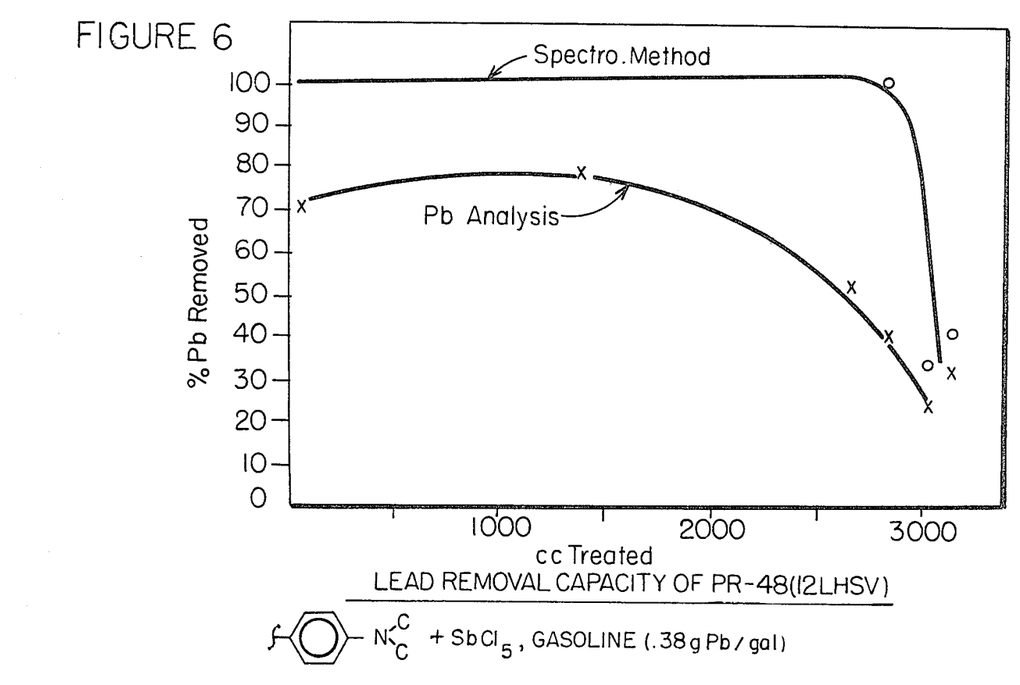

Following the contacting of the 2.5 grams of lead/gallon of gasoline fuel with the sorbent prepared as previously described, the lead content of the treated gasoline was analyzed as follows:

A 5 part by volume sample of gasoline was treated with 1 part of volume of a saturated solution of silver nitrate ($AgNO_3$) in absolute ethanol. After standing for 10 minutes, the content of reduced silver in the sample was determined by turbidometric technique. These measurements were done at 425 nm or 500 nm depending on the gasoline used. The measured transmission was compared with a standard analytical curve similar to the one illustrated by FIG. 4. Results of examples 1–8 are illustrated by Table 1.

TABLE 1

| Example Number | Sorbent Designation | Sorbent Complex | Solvent | Time | Metal Removal (% Pb) | Remarks |
|---|---|---|---|---|---|---|
| 1 | SB-6 | [polymer]-⟨C₆H₄⟩-CH₂N(CH₃)₂·SnCl₄ | ETOET | 20 min<br>1 hr | 90%<br>100% | |
| 2 | SB-8 | [polymer]-⟨C₆H₄⟩-CH₂N(CH₃)₂·SnCl₄ | (CH₃)₂CO | 20 min<br>1 hr<br>2 hr | 0<br>45%<br>71% | 3 hr - 66%<br>1 wk - 100% |
| 3 | SB-9 | [Acrylic]-N(C)(C)·SnCl₄ | (CH₃)₂CO | up to 1 wk | 0 | |
| 4 | SB-10 | [polymer]-⟨C₆H₄⟩-C-N(C)(C)-SnCl₄ | (CH₃)₂CO | 20 min<br>1 hr<br>2 hr | 0<br>23<br>95 | 1 wk - 100% |
| 5 | SB-11 | [polymer]-⟨C₆H₄⟩-CH₂Cl·SnCl₄ | (CH₃)₂CO | 20<br>1 hr<br>2 hr | 0<br>77<br>94 | 1 wk - 96% |
| 6 | BI | DEAE cellulose·SnCl₄ | | | 68 | |
| 7 | PR-65-A | [polymer]-⟨C₆H₄⟩-N(C)(C)·SnCl₄<br>[polymer]-⟨C₆H₄⟩-N(C)(C)·SbCl₅ | o-Dichlorobenzene | 1 hr | 100 | |
| 8 | PR-65-B | [polymer]-⟨C₆H₄⟩-CH₂Cl·SnCl₄<br>[polymer]-⟨C₆H₄⟩-CH₂Cl·SbCl₅ | o-Dichlorobenzene | 1 hr | 100 | |

Comparison of example 3 with the other example results tabulated in Table 1 gives an indication of the importance of the substrate surface area. The acrylic substrate used in example 3 had a surface area substantially lower than the other substrates used, and as the results indicate, the lead removal ability of the sorbent formed with it was substantially lower than the other examples.

It is contemplated that substrates of the type described in this disclosure include spent cracking catalysts and inorganic oxides such as clays and pumice.

EXAMPLES 9–12

Metal halides having Lewis acid character were attached to various substrates as noted in Table 2. The table also indicates the solvent used during metal halide incorporation and the volume of gasoline passed over 10 parts by volume of sorbent while still maintaining at least 50% removal of the initial lead at 11–13 LHSV.

The leaded gasoline to be treated was passed over the sorbent under the following continuous flow conditions: The general procedure involved passing volumes of about 0.4 gram of lead/gallon of gasoline fuel through a 10 part by volume quantity of resin supported on a glass frit. The flow rates were controlled by varying the percent of stroke on a variable displacement pump, while a 1 to 2 part by volume gasoline hydraulic head was maintained above the resin by a fine adjustment stopcock.

The sorbents utilized in examples 9-12 were analyzed in a manner similar to the procedure described in examples 1-8.

gasoline of about 0.4 grams of Pb/gallon of fuel. The lead content of the used sorbents was also determined by chemical analysis, and the results summarized in Table 3. The gasoline flow conditions were identical to those described in the procedure recited in examples 9-12.

Those sorbents which efficiently removed lead and had large capacities in general showed little or no loss of tin or antimony to be processed gasoline. Lead removal by the sorbents in general paralleled the volume

TABLE 2

PERFORMANCE OF VARIOUS METAL HALIDE REDISTRIBUTION REAGENTS IN LEAD REMOVAL FROM GASOLINE

| Example Number | Sorbent Designation | Sorbent[a] | Metal Halide | Solvent used during metal halide incorporation | $V_{1/2}$ cc/10 cc (sorbant)[b] |
|---|---|---|---|---|---|
| 9 | PR-30 | ⟨O⟩—CH$_2$(C-1).9(CN).1  EGDM | SnCl$_4$ | Acetone | 1200 |
| 10 | PR-34 | ⟨O⟩  EGDM | | Benzene | 1400 |
| 11 | PR-44 | ⟨O⟩—N⟨C,C⟩  DVB | SnCl$_4$ | Acetone | 1600 |
| 12 | PR-48 | ⟨O⟩—N⟨C,C⟩  DVB | SbCl$_5$ | Chloroform | 2700 |

[a]Subscript denotes crosslinking agent. EGDM = Ethylene glycol dimethacrylate. DVB = Divinylbenzene.
[b]Capacity at LHSV = 10-13

EXAMPLES 13-19

A number of sorbents containing tin chloride (SnCl$_4$) or antimony pentachloride (SnCl$_5$) were analyzed for tin or antimony content before and after processing a gasoline processed in which 20% of the lead was removed. In example 18 nearly 3% by weight lead was incorporated into the sorbent. At such a high level of lead, its recovery by acid extraction would appear to be economically feasible.

TABLE 3

TIN RETENTION AND LEAD PICKUP BY VARIOUS SORBENTS CONTAINING SnCl$_4$

| Example Number | Sorbent Designation | Sorbent Matrix | Wt% Sn Initial | Wt% Sn* Final | Wt% Pb* Final | Volume of* 0.33-0.39 gPb/gal gasoline Deleaded (cc/10cc sorbent) |
|---|---|---|---|---|---|---|
| 13 | SB-11 | ⟨O⟩—CH$_2$—Cl  DVB | .22 | .07 | .02 | 343 |
| 14 | SB-21 | ⟨O⟩—CH$_2$—Cl  EGDM | 1.32 | .8 | .04 | 665 |
| 15 | SB-8 | ⟨O⟩—C—N⟨C,C⟩  DVB | 11.4 | 12.2 | .04 | 1240 |
| 16 | SB-13 | ⟨O⟩—C(Cl).5(CN).5  EGDM | 2.61 | 2.45 | 1.4 | 2142 |

TABLE 3-continued

TIN RETENTION AND LEAD PICKUP BY VARIOUS SORBENTS CONTAINING SnCl$_4$

| Example Number | Sorbent Designation | Sorbent Matrix | Wt% Sn Initial | Wt% Sn* Final | Wt% Pb* Final | Volume of* 0.33–0.39 gPb/gal gasoline Deleaded (cc/10cc sorbent) |
|---|---|---|---|---|---|---|
| 17 | PR-44 | [structure: DVB-phenyl-N(C)(C)] | 7.1 | 2.91 | 1.2 | 2294 |
| 18 | PR-46 | [structure: SiO$_2$-O-Si(OH)-C-C-N(C)-C-C-N(C)-C] | 4.3 | 3.6 | 2.8 | 2626 |
| 19 | PR-48 | [structure: DVB-phenyl-N(C)(C)] | Wt% Sb 14.0 | Wt% Sb 14.6 | .28 | 3144 |

*All runs were terminated shortly after the sorbent no longer removed > 20% of the lead ($\mu$ .4 g/gal) at LSHV = 11–13

EXAMPLES 20–29

A class of sorbents with tin chloride in combination with active halogen was further modified by the addition of weak Lewis bases (nitriles). The relative concentration of halogen to nitrile; swelling of the sorbent after nitrile modifying treatment and stannic chloride addition; the weight percentage of tin incorporated with the sorbent; and the volume of gasoline passed over 10 volumes of the treated sorbent until 50% of the initial lead (0.4 gm/gal.) at 11–13 LHSV could no longer be removed were measured and summarized in Table 4. The gasoline flow conditions were identical to those described in the procedure recited in examples 9–12.

TABLE 4

SORBENT EFFICIENCY OF SnCl$_4$ + BENZYL HALIDE CONTAINING POLYMERS

Mole % remaining of original [structure: phenyl-CH$_2$-X]

| Example Number | Sorbent Designation | Base Resin Number | Cross Linking Agent* | Modifying Treatment | Wt% Cl in Original | %-CH$_2$-Cl | %-CH$_2$CN |
|---|---|---|---|---|---|---|---|
| 20 | — | 5 | E (gel) | None | | 100 | — |
| 21 | SB-11 | 4 | D | None | 11.2 | 100 | — |
| 22 | SB-21 | 2 | E | None | 20.0 | 100 | — |
| 23 | PR-30 | 2 | E | KCN/H$_2$O (58°C) 16 hr | 20.0 | 90 | 10 |
| 24 | SB-13 | 1 | E | NaCN/H$_2$O (warm) 16 hr | 17.1 | 50 | 50 |
| 25 | PR-36 | 2 | E | KCN/DMSO (50°C) 16 hr | 20.0 | 20 | 80 |
| 26 | SB-13R | 1 | E | SB-13 regenerated | 20.0 | 50 | 50 |
| 27 | PR-32 | 2 | E | KCN/H$_2$O (40°C) 72 hr | 20.0 | | |
| 28 | PR-39 | 3 | E | NaOH/H$_2$O (50°C) 16 hr | 18.4 | ~100 | |
| 29 | PR-33 | 2 | E | Sonicated (125w) 10 min | 20.0 | 100 | |

*E is ethylene glycol dimethylacrylate. D is divinylbenzene.

| Example Number | Swelling after treatment | (Δcc/gm) after SnCl$_4$ | Wt % Sn$^{+4}$ incorporated | Vol$_{1/2}$ LHSV - 11–13 | % Sn Efficiency |
|---|---|---|---|---|---|
| 20 | 0 | 0 | — | 150 | 28 |
| 21 | — | — | .22 | 500 | 19 |
| 22 | .65 | — | 1.32 | 1200 | 32 |
| 23 | .42 | .05 | 2.5 | >2000 | >43 |
| 24 | .45 | .35 | 2.61 | 700 | 28 |
| 25 | — | — | 1.50 | 1600 | — |
| 26 | — | — | — | 230 | low |
| 27 | .28 | — | — | 300 | low |
| 28 | — | — | — | 300 | low |
| 29 | — | .58 | — | | |

EXAMPLES 30–35

The tin distribution in a number of sorbent matrices was determined by electron microprobe techniques; leaded gasoline was passed over a 10 part by volume sample of each sorbent until the sorbent was no longer able to remove 50% of the initial lead concentration (0.4 gm/gal) at 11–13 LHSV according to the flowing test procedure recited in examples 9–12; and finally the lead distribution in the sorbent was determined by microprobe techniques. The percent tin efficiency, that is the percent of the original tin which operated to remove lead, was calculated for each sorbent.

Table 5 illustrates the physical properties or characteristics of various sorbents all of which contained tin chloride ($SnCl_4$). The table shows the amount of tin (Sn) initially deposited on each sorbent, and the uniformity of the distribution throughout the sorbent.

TABLE 5
SORBENT EFFICIENCY AND PHYSICAL PROPERTIES OF SELECTED $SnCl_4$ CONTAINING MATRICES

Tertiary Amine Series

| Example No. | 30 | 31 | 32 |
|---|---|---|---|
| Sorbent Designation | SB-8 | PR-44 | PR-46 |
| Sorbent Matrix | (phenyl)–C–N(C)(C) | (phenyl)–N(C)(C) | silica–Si(O)(OH)–CH₂CH₂–N(C)(C) structure |
| Surface Area (M²/gm) | ~30 | 67 | 340 |
| Swelling$^a$ (Δ cc/g) | | .48 | ~0 |
| Density - found (g/cc) | | .55 | .4 |
| Density - calculated (g/cc) | .53 | .57 | .41 |
| Pore volume cc/g | .6 | .6 | 1.16 |
| % Pore size dist. > 300A | | | 8.5 |
| 300–100A | major | | 59.3 |
| 100–50A | | major | 32.2 |
| > 50A | | | small |
| % $Sn_b$ | 11.4 | 7.1 | 4.3 |
| % $Cl_b$ | 6.2 | | |
| % X | $[5.32]_N$ | $[3.28]_N$ | $[0.5]_N$ |

ACTIVE HALOGEN SERIES

| Example No. | 30 | 31 | 32 |
|---|---|---|---|
| Sorbent Designation | SB-11 | SB-21 | SB-13 |
| Sorbent Matrix | DVB –(phenyl)–CH₂–Cl | EGDM –(phenyl)–CH₂–Cl | EGDM –(phenyl)–CH₂–Cl / –(phenyl)–CH₂–CN |
| Surface Area (M²/gm) | <5 | 19 | 20 |
| Swelling$^a$ (cc/g) | | .65 | .45 |
| Density - found (g/cc) | | | .63 |
| Density - calculated (g/cc) | .74 | .74 | .74 |
| Pore volume cc/g | .1–.3 | .207 | 2.04 |
| % Pore size dist. >300A | major | 94.2 | 94.9 |
| 300–100A | | 1.5 | 0.3 |
| 100–50A | | } 4.2 | } 4.8 |
| <50A | | | |
| %$Sn_b$ | .22 | 1.32 | 2.61 |
| %$Cl_b$ | [11] | [21] | [9.7] |
| %X | | | |

| Example No. | 33 | 34 | 35 |
|---|---|---|---|
| Sorbent Designation | SB-8 | PR-44 | PR-46 |
| Sn distribution (fresh)$^c$ | | u | u |
| Pb distribution (used)$^d$ | | u | u |
| Initial % Pb Removal/pass | ~90 | 80 | 95 |
| $Vol_{1/2}^e$ (cc) | 300 | 1600 | 2400 |
| moles Sn/10 cc sorbent | 5.51 | 3.43 | 1.49 |
| moles Pb removed at $vol_{1/2}$ | .08 | .54 | 1.00 |
| % Sn efficiency | 1.5 | 16 | 67 |
| Example No. | 33 | 34 | 35 |
| Sorbent Designation | SB-11 | SB-21 | SB-13 |
| Sn Distribution | s(11%) | s(10%) | s(14%) |
| Pb distribution (used)$^d$ | (u-s) | (u-s) | (u-s) |
| Initial % Pb Removal | 90 | 90 | 85 |
| $Vol_{1/2}^e$ (cc) | 150 | 500 | <2000 |
| moles Sn/10 cc sorbent | .14 | .83 | 1.64 |
| moles Pb removed at vol | .04 | .16 | <.71 |
| % Sn efficiency$^f$ | 29 | 19 | <43 |

$^a$Determined for non-Sn containing sorbents, gasoline solvent.
$^b$Bracketed numbers refer to the sorbent matric prior to Sn incorporation
$^c$s (11%) = shell distribution, the depth of the shell = (11%) of the radius from the exterior surface inward; u = uniform distribution.
$^d$(u-s) = uniform distribution in the center portion of the particle where Sn was not found.
$^e$Volume of gasoline passed over 10 cc of sorbent while still maintaining at least 50% removal of the initial Pb (.4g/gal) at 11–13 LHSV.
$^f$The % of the original Sn which operated efficiently in removing lead.

EXAMPLES 36–39

Four sorbents were tested at LHSV 11–13 under the flowing test procedure recited in examples 9–12. Under these conditions the lead removal was high, generally above 80%. The treated gasoline was tested to determine its nitrogen component concentration to determine the amount of indigenous basic nitrogen compounds in gasoline removed during the lead removal process. A separate analysis of a detergent additive was also made. Results are shown in Table 6.

EXAMPLES 40–46

Four sorbents, similar or identical to those tested in examples 36–39 were tested at space velocities ranging from 11–40 LHSV. The sorbents were tested by passing 75–150 bed volumes of leaded gasoline over each sorbent and measuring the lead content of the gasoline before and after treatment. The initial lead concentration was varied from 0.10 to 0.39 grams of lead per gallon of gasoline. The results of the test are shown in Table 7.

TABLE 6
THE EFFECT OF LEAD REMOVAL ON THE NITROGEN AND NITROGEN BASED DETERGENT CONTENT OF GASOLINE

| Example No. | 36 | | 37 | |
|---|---|---|---|---|
| Sorbent Designation | SB-13 | | PR-44 | |
| SUBSTRATE |  | |  | |
| Metal Halide | $SnCl_4$ | | $SnCl_4$ | |
| | "N" Content (ppm) | Parts by volume Fuel Processed i.e. | "N" Content (ppm) | Parts by volume Fuel Processed i.e. |
| | 12 | Original | 13 | Original |
| | 2.0 | 375 | 4.5 | 78 |
| | 3.0 | 500 | 5.7 | 1364 |
| | 3.0 | 870 | 6.7 | 1918 |
| | 6.9 | 1570 | | |
| | | | No Detergent Removal in 1st 400cc. | |

| Example No. | 38 | | 39 | |
|---|---|---|---|---|
| Sorbent Designation | PR-48 | | PR-46 | |
| SUBSTRATE |  | |  | |
| Metal Halide | $SbCl_5$ | | $SnCl_4$ | |
| | "N" Content (ppm) | Parts by volume Fuel Processed (cc) | "N" Content (ppm) | Parts by volume Fuel Processed (cc) |
| | 14 | Original | 14 | Original |
| | 3.6 | 80 | 3.1 | 722 |
| | 3.5 | 1394 | 4.2 | 1614 |
| | 5.1 | 2680 | 7.9 | 2626 |
| | 6.2 | 3034 | | |
| | No Detergent Removal in 1st 400cc | | 33% Detergent Removal in 1st 400cc. (No removal after 400cc) | |

[a] Original content was 24 No./1000 BBL or 3.6 ppm"N".
[b] In all cases 10 parts by volume of sorbent was used to remove the leat at 11–13 LHSV.

TABLE 7

| Sorbent | Example Number | Space Velocity | Lead Concentration g/gal | |
|---|---|---|---|---|
| | | | Feed | Product[a] |
|  | 40 | 12 | .36 | .01 |
| + $SnCl_4$ | 41 | 40 | .36 | .01 |
|  + $SnCl_4$ | 42 | 13 | .36 | .16 |
| " | 43 | 11 | .10 | .04[b] |
| " | 44 | 28 | .10 | .02[b] |
|  + $SbCl_5$ | 45 | 13 | .38 | .07 |

TABLE 7-continued

| Sorbent | Example Number | Space Velocity | Lead Concentration g/gal Feed | Product[a] |
|---|---|---|---|---|
|  | 46 | 13 | .39 | .11[b] |

[a] Lead analysis after 150 bed volumes except as noted
[b] After 75 bed volumes.

EXAMPLE 47

A cyanide-treated chloromethylated polystyrene resin (sorbent designating SB-13) which had been promoted with stannic chloride, and which had been rendered inactive by satisfactorily treating over 200 volumes of leaded gasoline (0.33–0.39 grams/gal.), was washed with portions of benzene, methanol and water. 250 volumes of 20% hydrochloric acid was then passed over the resin which was next washed with 250 volumes water, methanol and finally air-dried. Two volumes of stannic chloride in 30 volumes of acetone was then passed over the resin, followed by 100 volumes of acetone; the resin was then dried in air.

Figure 9:
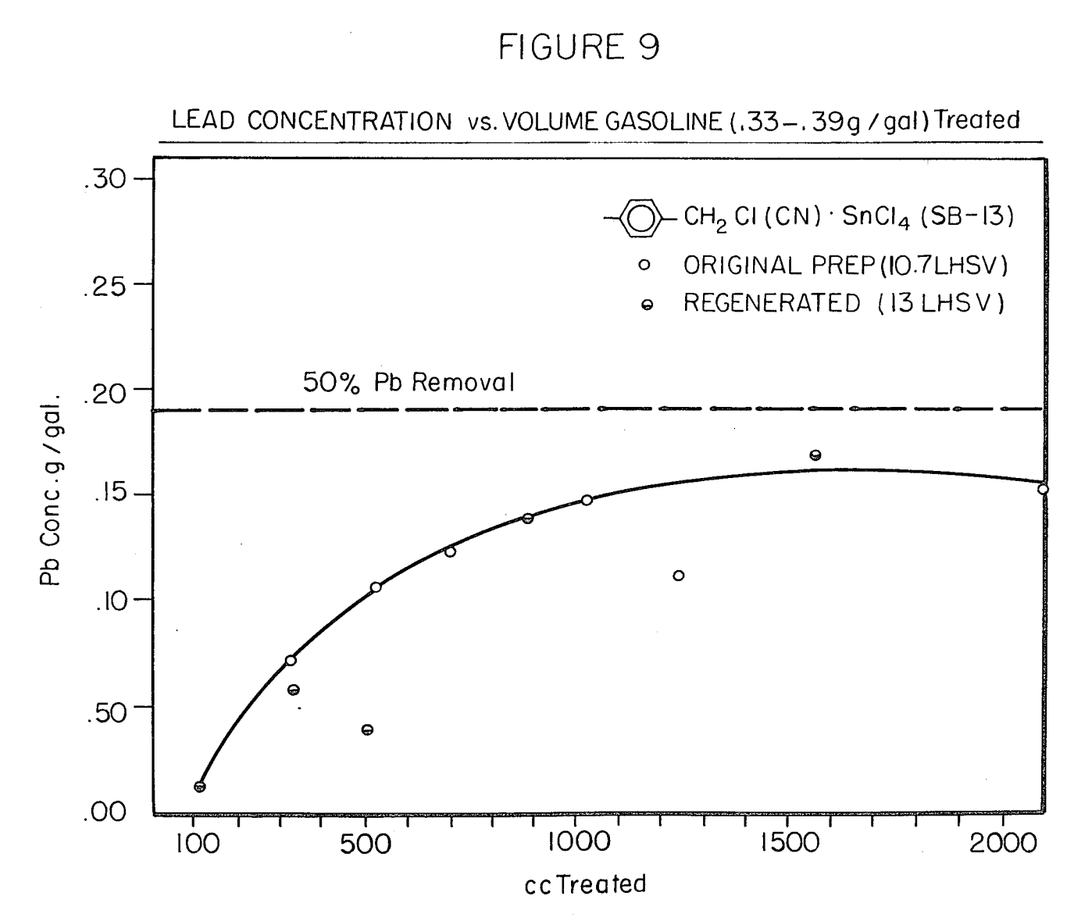
FIG. 9 is a set of curves illustrating lead concentration as a function of volume of leaded gasoline treated.
Figure 10:
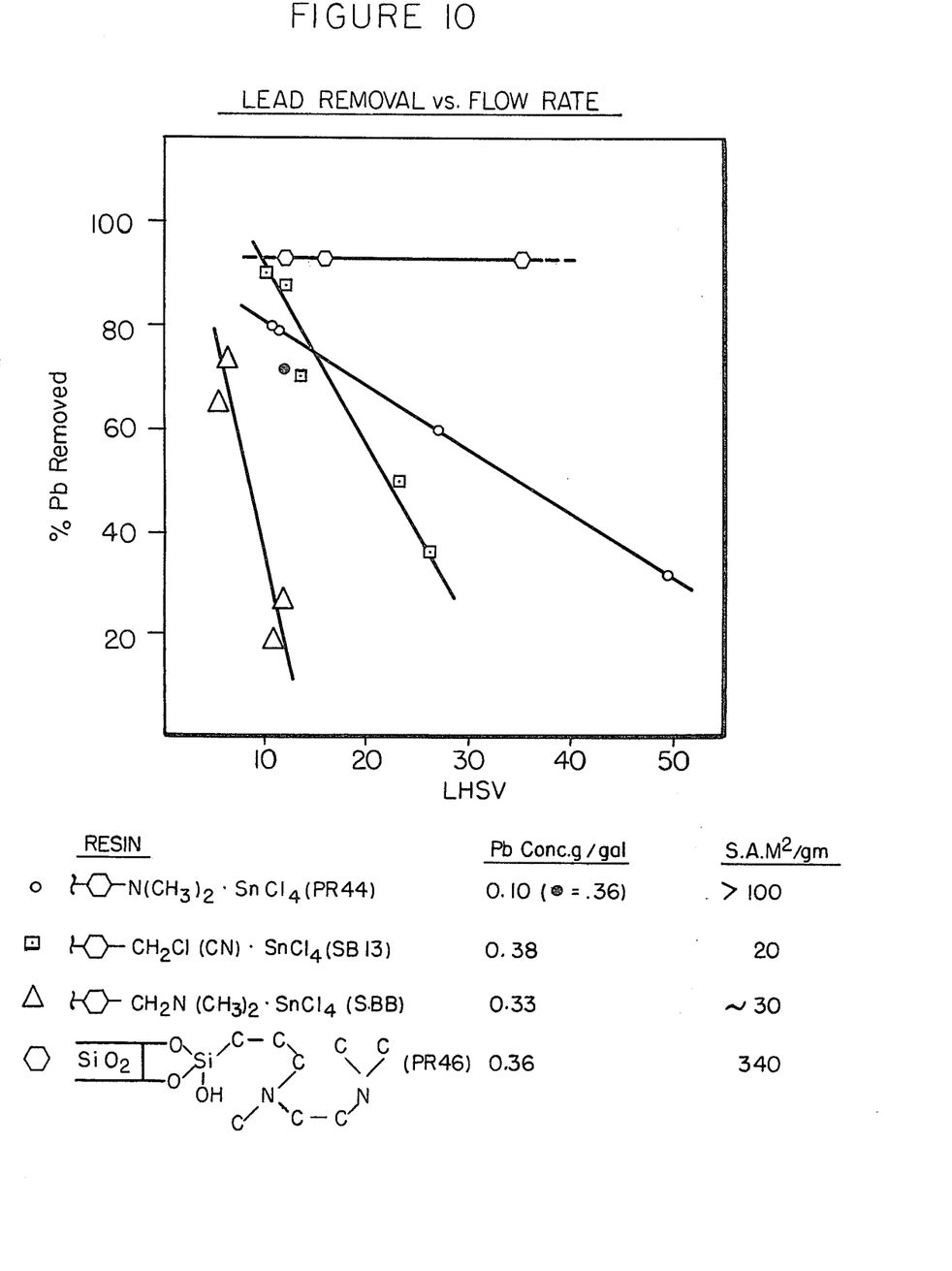
FIG. 10 is a series of curves illustrating lead removed as a function of flow rate.

This regenerated sorbent was again used to remove lead from gasoline leaded to a 0.33–0.39 gm/gal. level. The results of the lead removal capability of the regenerated sorbent are plotted in FIG. 9.

EXAMPLES 48–51

Figure 7:
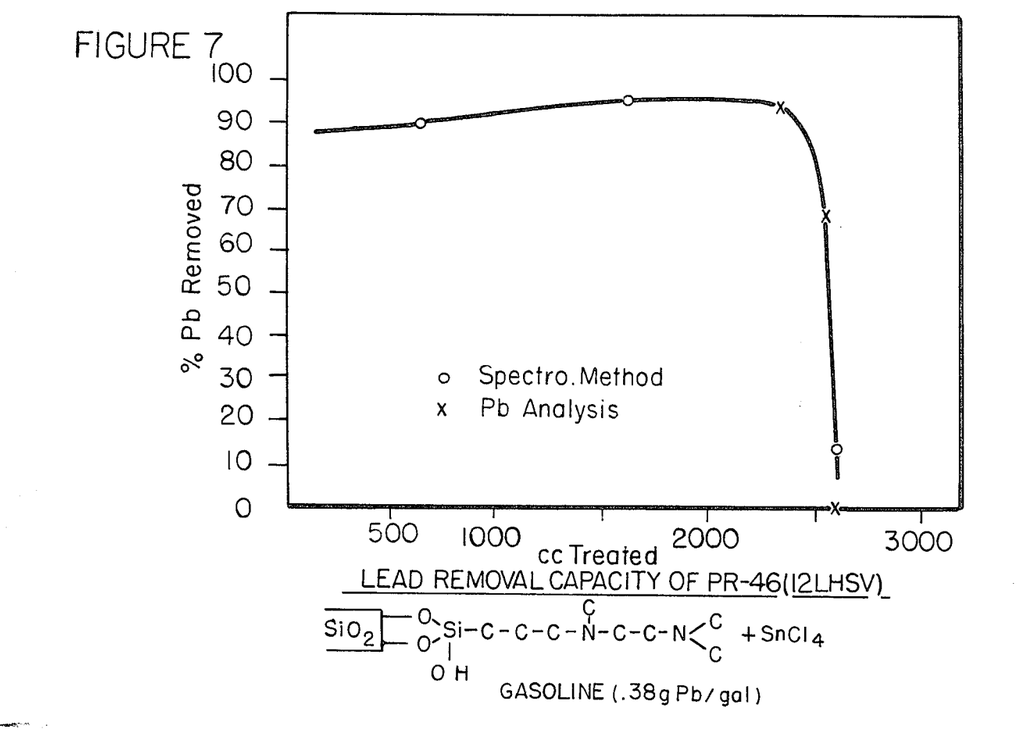
Figure 8:
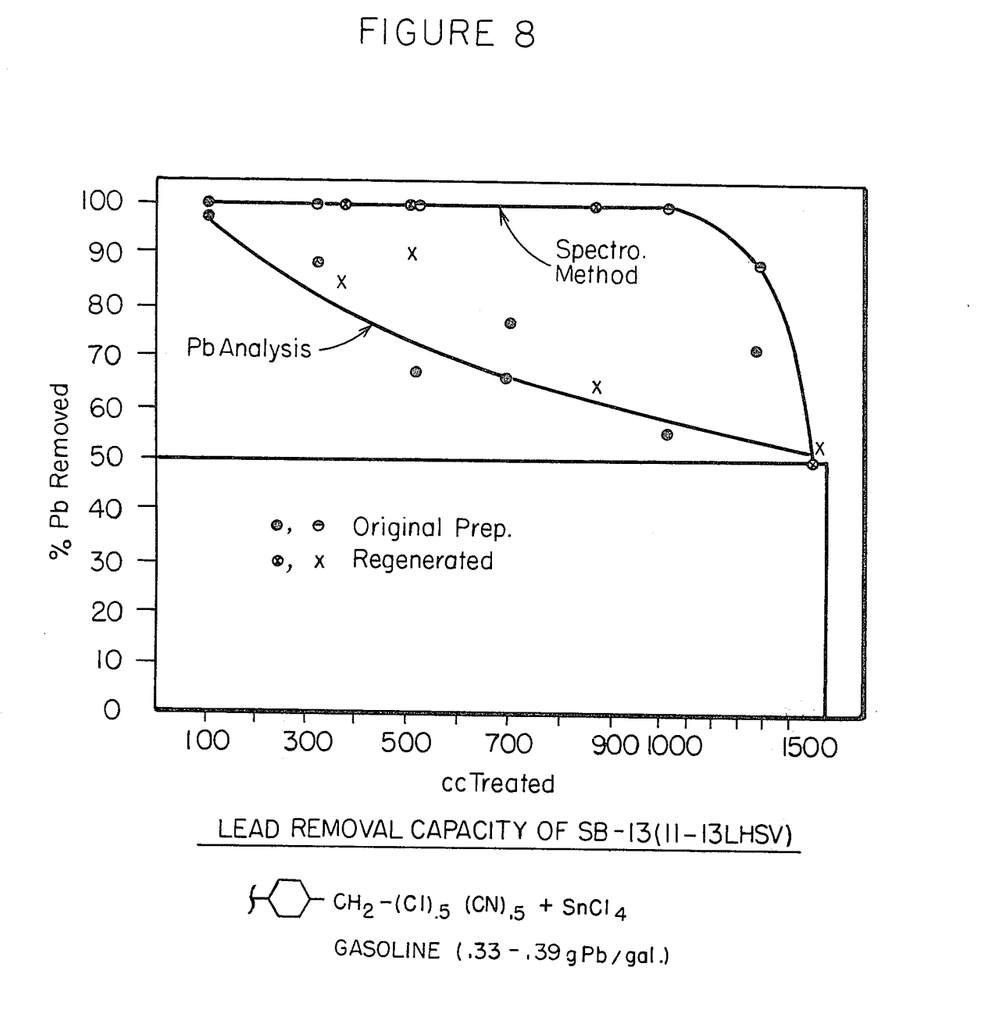

A gasoline having a lead level of 0.36 gram/gallon was diluted with a very low lead level gasoline until the mixture's lead level was reduced to 0.10 gram/gallon. Four sorbents were then tested at varying LHSV ranging from about 5 to 50 under the flowing test procedure recited in examples 9–12. The response of the low lead gasoline to space velocity variation was consistent with the results at higher lead levels. The efficiency of sorbent designated as PR-44 was compared at two different lead levels (0.36 gram of lead/gallon and 0.10 gram/gal). As noted in FIG. 7, the efficiencies were substantially identical.

EXAMPLES 52

Figure 11:
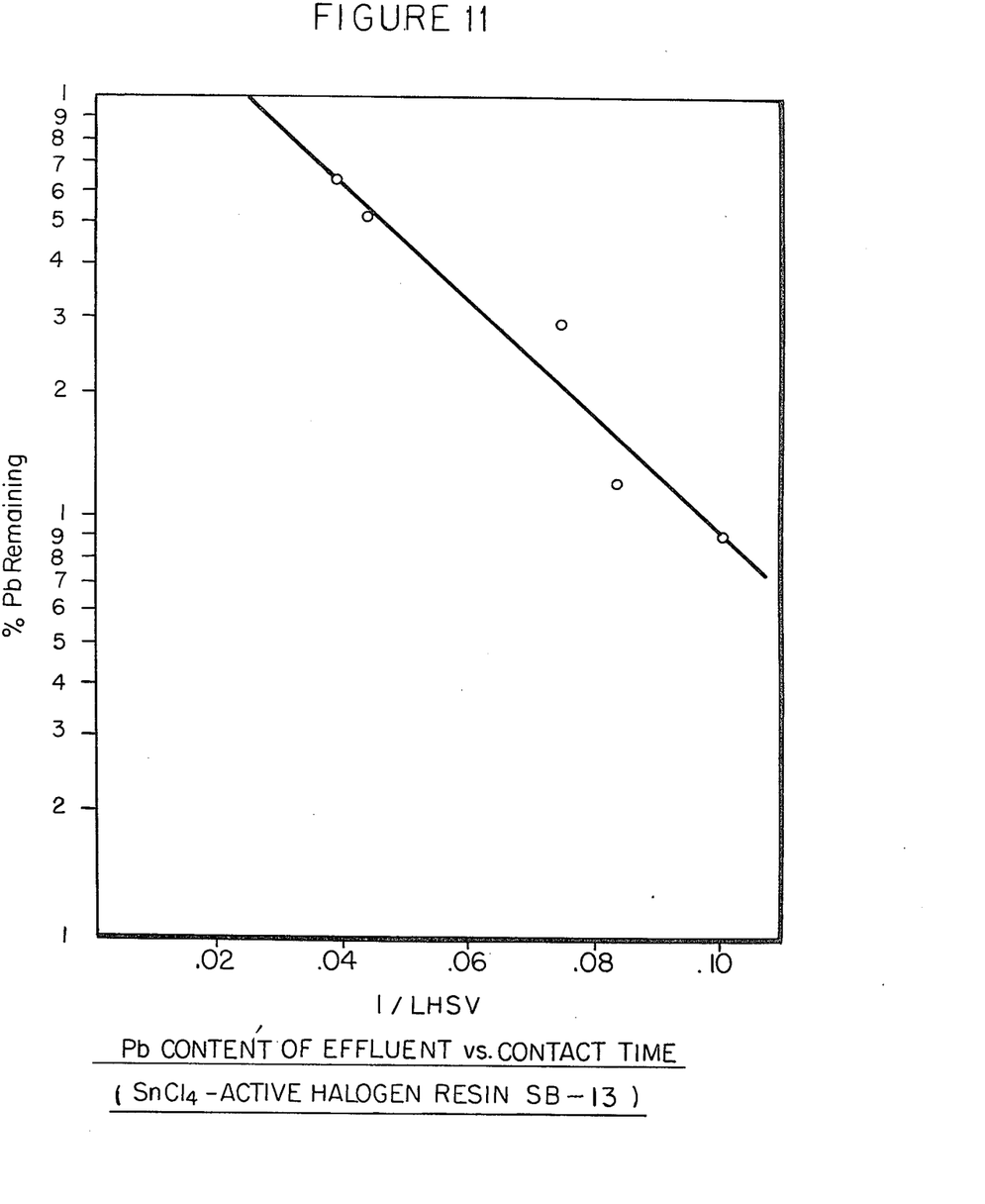
FIG. 11 is a curve illustrating lead content of effluent as a function of contact time.

The sorbent designated SB-13 was subjected to the gasoline flowing conditions recited in examples 9–12. The gasoline had a lead concentration of about 0.4 gm/gal, and the space velocity was varied from approximately 10 to 50 LHSV. The lead removal ability of the sorbent at the various space velocities was determined by atomic absorption analysis; the results are plotted in FIG. 11.

EXAMPLES 53

Figure 12:
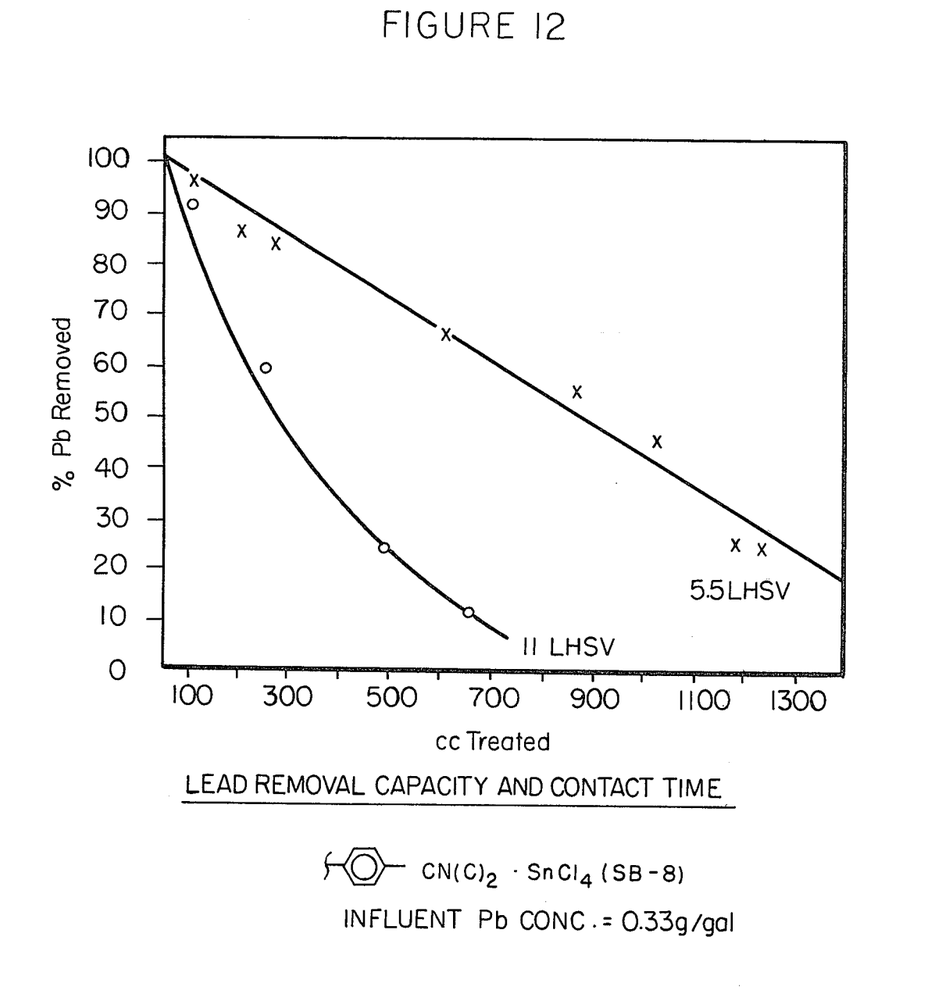
FIG. 12 is a set of curves illustrating lead removal capacity as a function of contact time.

The sorbent designated SB-8 was subjected to the gasoline flowing conditions recited in examples 9–12. The gasoline had a lead concentration of about 0.4 gram/gallon, and the sorbent was tested at space velocities of 5.5 and 11 LHSV. The lead removal capability of the SB-8 sorbent at the two space velocities was determined after various volumes of gasoline had been passed over the sorbent through the use of atomic absorption analysis; the results are plotted on FIG. 12.

EXAMPLE 54

The preparation of a silica based sorbent containing primary and secondary amine functional groups and attached stannic chloride is described below.

The xylene used as solvent in catalyst preparations was dried by azeotropic distillation using a Dean-Stark trap. The silica used was Davison Grade 59 (properties of which are given in the table below) ground to 12/100 mesh and dried in a vacuum over at approximately 120°C for about 4 hours.

| Davison Grade 59 Silica Gel | |
|---|---|
| Silica Content (Dry Basis) | 99.0% (Min.) |
| Total Volatile at 1750°F | 4.5% (Max.) |
| Apparent Density | Approx. 25 lbs. per cubic foot |
| Specific Heat | 0.22 BTU/16°F |
| Surface Area | 340 Sq. Meters/gm |
| Pore Diameter (average) | 140 Angstroms |
| Pore Volume | 1.15 CC/gm |
| CHEMICAL ANALYSIS Typical (Dry Basis) | |
| Silica as $SiO_2$ | 99.50 |
| Iron as $Fe_2O_3$ | 0.01 |
| Aluminum as $Al_2O_3$ | 0.10 |
| Titanium as $TiO_2$ | 0.02 |
| Calcium as CaO | 0.07 |
| Sodium as $Na_2O$ | 0.06 |
| Zirconium as ZrO | 0.03 |
| Trace Elements | 0.03 |
| MOISTURE ADSORPTION Typical | |
| 10% R.H. | 1.71 |
| 20% R.H. | 2.88 |
| 40% R.H. | 4.96 |
| 60% R.H. | 7.80 |
| 80% R.H. | 16.96 |
| 100% R.H. | 93.50 |

Approximately 150g silica suspended in about 750 ml. xylene was added 30.5g N-($\beta$-aminoethyl)-$\gamma$-aminopropyltrimethoxysilane. The mixture was stirred under reflux (about 105°C) for approximately 4 hrs. and cooled. The liquid was decanted and the solid product was washed 3 times with about 400 ml. portions of n-hexane, stirred in hot distilled water for about ¾ hr. (to promote complete reaction and also remove unreacted silane) washed with water, and dried in a vacuum oven at about 130°C for approximately 16 hr. This material contained about 4.50 wt.%C, 1.23 wt.%H and 1.1 wt.%N.

To about 60 cc. acetone in an approximately 250 cc. Erlenmeyer flask was added with stirring 4.0 cc. stannic chloride. Then about 20cc. of the above functionalized silica was added. The flask was stoppered and the mixture was shaken occasionally over a period of about one-half hour. The sorbent was then transferred to a chromatographic column and washed three times with about 25cc. volumes of acetone. The sorbent was dried by passing $P_2O_5$-dried nitrogen through the sorbent bed. The final product was designated PR-81 and contained 4.3 wt.% Sn.

EXAMPLE 55

The preparation of a silica based sorbent containing tertiary amine functional groups and attached stannic chloride is described below.

Approximately 110 g. portion of the functionalized silane of Example 1 was suspended in about 250 ml. of 88% formic acid and about 185 ml. 37% formaldehyde and stirred under reflux (~98°C) for aproximately 12 hr. After cooling, the liquid was decanted. The solid was washed 3 times with about 300 ml. distilled water, suspended in about 300 ml. distilled water and sufficient 1 N NaOH (~90 ml.) was added until the solution was neutral. The product was then filtered out, washed with about 300 ml. distilled water, stirred in about 700 ml. 90°C distilled water for approximately 1 hr., filtered and dried in a vacuum oven at about 130°C for approximately 16 hr. Analysis: 4.5% C, 1.23%H, 1.1% N. Tin chloride was incorporated in an identical manner to that of Example 1. The final product was designated PR-80 and contained 3.2 wt.% Sn.

EXAMPLES 56–57

The above sorbents (PR80 and PR81) were used to remove lead alkyl contaminants from a commercial gasoline. The initial concentration of lead was about 0.4g/gal. The flow rate varied between 12 and 24 LHSV and under these conditions the sorbents were effective for removing more than 55% of the lead alkyl from the volumes of gasoline as listed below in Table 8.

TABLE 8

| Example | Sorbent Designation | Capacity (volumes of gasoline/volume of sorbent) |
|---------|---------------------|--------------------------------------------------|
| 56      | PR-80               | >425                                             |
| 57      | PR-81               | >480                                             |

EXAMPLES 58–59

The sorbents Pr 80 and PR 81 were found to be more effective at elevated temperatures as shown in Table 9 where the instantaneous lead removal increased markedly on raising the temperature. The sorbents being studied were aged due to use and were operating at 12 LHSV. Increased capacities at higher temperatures were also observed.

TABLE 9

| Sorbent Designation | Example | Instantaneous Pb Removal at 25°C | Instantaneous Pb Removal at 55°C | Capacity for more than 55% Pb Removal at 55°C (volumes/vol. of sorbent) |
|---------------------|---------|----------------------------------|----------------------------------|-------------------------------------------------------------------------|
| PR-80               | 58      | 74%                              | 94%                              | >475                                                                    |
| PR-81               | 59      | 56%                              | 87%                              | >525                                                                    |

EXAMPLE 60

The sorbent containing primary amine functional groups designated PR-100 was prepared as in Example 1 from antimony pentachloride and an aminopolystyrene resin containing 2.35% nitrogen. The sorbent was used to remove lead alkyl contaminants from gasoline containing 0.105 g. Pb/gal. The flow rate was 12 LHSV. Under these conditions the sorbent was effective in removing more than 55% of the lead alkyl from 230 volumes gasoline/volume sorbent.

EXAMPLE 61

The sorbent designated PR-91 was prepared in Example 54 from antimony pentachloride and the functionalized silica. The sorbent contained 8.37% antimony and was used to remove lead alkyl contaminants from a commercial gasoline containing 0.22g Pb/gal. The flow rate was 12–48 LHSV and the temperature was −20°C. Under these conditions the sorbent was effective in removing more than 55% of the lead alkyl from 380 volumes gasoline/volume sorbent. The gasoline detergent was not removed.

EXAMPLE 62

$\gamma$-Alumina having a surface area of about 200 $M^2/g$ was functionalized as in Example 54 to give a product containing about 2.09% N. This product was then treated with antimony pentachloride to give the sorbent (PR-118) containing about 5.82% Sb. The sorbent was then used to remove lead alkyl contaminants from a gasoline blend containing about 0.0805 g. Pb/gal. The flow rate was approximately 12–24 LHSV. Under these conditions the sorbent was effective in removing over 50% of the lead alkyl from more than 600 volumes gasoline/volume sorbent.

What is claimed is:

1. A composition of matter comprising a substantially solid substrate comprising silicon having a minimum surface area of about 10 $m^2/g$ to 800 $m^2/g$ having pores with a minimum pore diameter of about 10 A to 500 A, having N, N', N'-trimethyl-$\gamma$-propyl ethylene diamine bonded thereto and a Lewis acid metal halide, which metal is of the group consisting of iron, copper, silver, zinc, cadmium, mercury, aluminum, tin, lead, phosphorus, arsenic, antimony, bismuth, sulfur, selenium and telerium bonded to said amine.

2. The composition of matter as claimed in claim 1 wherein said metal halide is tin tetrachloride.

3. The composition of matter as claimed in claim 1 wherein said metal halide is antimony pentachloride.

4. The composition of matter as claimed in claim 1 wherein said substrate contains Al.

5. The composition of matter as claimed in claim 1 wherein said substrate contains Ti.

6. The composition of matter as claimed in claim 1 wherein said substrate comprises $SiO_2$.

* * * * *

UNITED STATES PATENT AND TRADEMARK OFFICE
CERTIFICATE OF CORRECTION

PATENT NO. : 3,944,501
DATED : March 16, 1976
INVENTOR(S) : Darrell D. Whitehurst, Stephen A. Butter and
Paul G. Rodewald It is certified that error appears in the above-identified patent and that said Letters Patent are hereby corrected as shown below:

Column 1, lines 10 - 12   "This application is a continuation-in-part of now pending U.S. application serial number 319,099 filed December 27." Should be deleted as per our Amendment dated October 15, 1973.

Column 19, line 43   "Pr" should be -- PR --

Signed and Sealed this

Sixth Day of July 1976

[SEAL]

Attest:

RUTH C. MASON
Attesting Officer

C. MARSHALL DANN
Commissioner of Patents and Trademarks